(12) United States Patent
Anapolsky et al.

(10) Patent No.: US 11,491,469 B2
(45) Date of Patent: Nov. 8, 2022

(54) KIRIGAMI DERIVED METAL CATALYSTS

(71) Applicant: Toyota Research Institute, Inc., Los Altos, CA (US)

(72) Inventors: Abraham S. Anapolsky, San Mateo, CA (US); Joseph Harold Montoya, Berkeley, CA (US)

(73) Assignee: Toyota Research Institute, Inc., Los Altos, TX (US)

( * ) Notice: Subject to any disclaimer, the term of this patent is extended or adjusted under 35 U.S.C. 154(b) by 85 days.

(21) Appl. No.: 16/835,460

(22) Filed: Mar. 31, 2020

(65) Prior Publication Data
US 2021/0299639 A1 Sep. 30, 2021

(51) Int. Cl.
| | | |
|---|---|---|
| *B01J 21/06* | (2006.01) | |
| *B01J 23/36* | (2006.01) | |
| *B01J 23/42* | (2006.01) | |
| *B01J 23/44* | (2006.01) | |
| *B01J 23/46* | (2006.01) | |
| *B01J 23/48* | (2006.01) | |
| *B01J 23/68* | (2006.01) | |

(Continued)

(52) U.S. Cl.
CPC .......... *B01J 23/6527* (2013.01); *B01J 35/026* (2013.01); *B01J 37/0228* (2013.01); *B01J 37/345* (2013.01); *B01J 37/349* (2013.01)

(58) Field of Classification Search
CPC ... B01J 23/36; B01J 23/42; B01J 23/44; B01J 23/46; B01J 23/48; B01J 23/6527; B01J 23/6567; B01J 23/687; B01J 23/688; B01J 35/026; B01J 37/0228; B01J 37/345; B01J 37/349; B01J 21/063
See application file for complete search history.

(56) References Cited

U.S. PATENT DOCUMENTS

| | | | | |
|---|---|---|---|---|
| 6,853,076 B2 * | 2/2005 | Datta | ................ | H01L 23/49816 257/738 |
| 7,196,001 B2 * | 3/2007 | Datta | ................ | H01L 23/49816 438/614 |

(Continued)

OTHER PUBLICATIONS

Choi, G. et al., "Programming shape using kirigami tessellations," Nature Materials, vol. 18, Sep. 2019, pp. 999-1004 (Abstract only).

(Continued)

*Primary Examiner* — Cam N. Nguyen
(74) *Attorney, Agent, or Firm* — Christopher G. Darrow; Darrow Mustafa PC

(57) ABSTRACT

A high surface area to mass catalyst is formed by a method that includes a Kirigami mapped cutting of a flat three metal laminate composite formed on a deposition support. Kirigami derived catalyst has a shape that provides a high surface to mass ratio and promotes the flow of a fluid containing a reagent for a reaction catalyzed by the exterior metal catalyst films of the three metal laminate composite. Structural integrity of the Kirigami derived catalyst results from a support metal film residing between two metal catalyst films. The shaping to the Kirigami derived structure involves cutting the flat three metal laminate composite to that of a Kirigami map, imposing stress on the cut structure to force a non-planar deformation, and delaminating the Kirigami derived catalyst from the deposition support.

20 Claims, 1 Drawing Sheet

(51) Int. Cl.
     *B01J 35/02*          (2006.01)
     *B01J 37/02*          (2006.01)
     *B01J 37/34*          (2006.01)
     *B01J 23/652*        (2006.01)

(56) References Cited

U.S. PATENT DOCUMENTS

| | | | |
|---|---|---|---|
| 7,250,678 B2* | 7/2007 | Datta | H01L 23/49816 |
| | | | 257/738 |
| 8,878,173 B2* | 11/2014 | Yamazaki | H01L 27/1225 |
| | | | 257/43 |
| 8,952,550 B2* | 2/2015 | Datta | H01L 24/05 |
| | | | 257/779 |
| 9,449,991 B2* | 9/2016 | Yamazaki | H01L 29/7869 |
| 10,037,956 B2* | 7/2018 | Datta | H01L 24/03 |
| 2006/0148233 A1* | 7/2006 | Datta | H01L 24/11 |
| | | | 438/614 |
| 2012/0125071 A1 | 5/2012 | Schroers et al. | |
| 2019/0030783 A1 | 1/2019 | Lu et al. | |
| 2019/0112191 A1 | 4/2019 | Martinez-Duarte et al. | |

OTHER PUBLICATIONS

Song, Z., "Studies of Origami and Kirigami and Their Applications", Ph.D. Thesis, Arizona State University (May 2016) 105 pages.

Mukerjee, S., "Particle size and structural effects in platinum electrocatalysis", Journal of Applied Electrochemistry 20 (1990) pp. 537-548.

\* cited by examiner

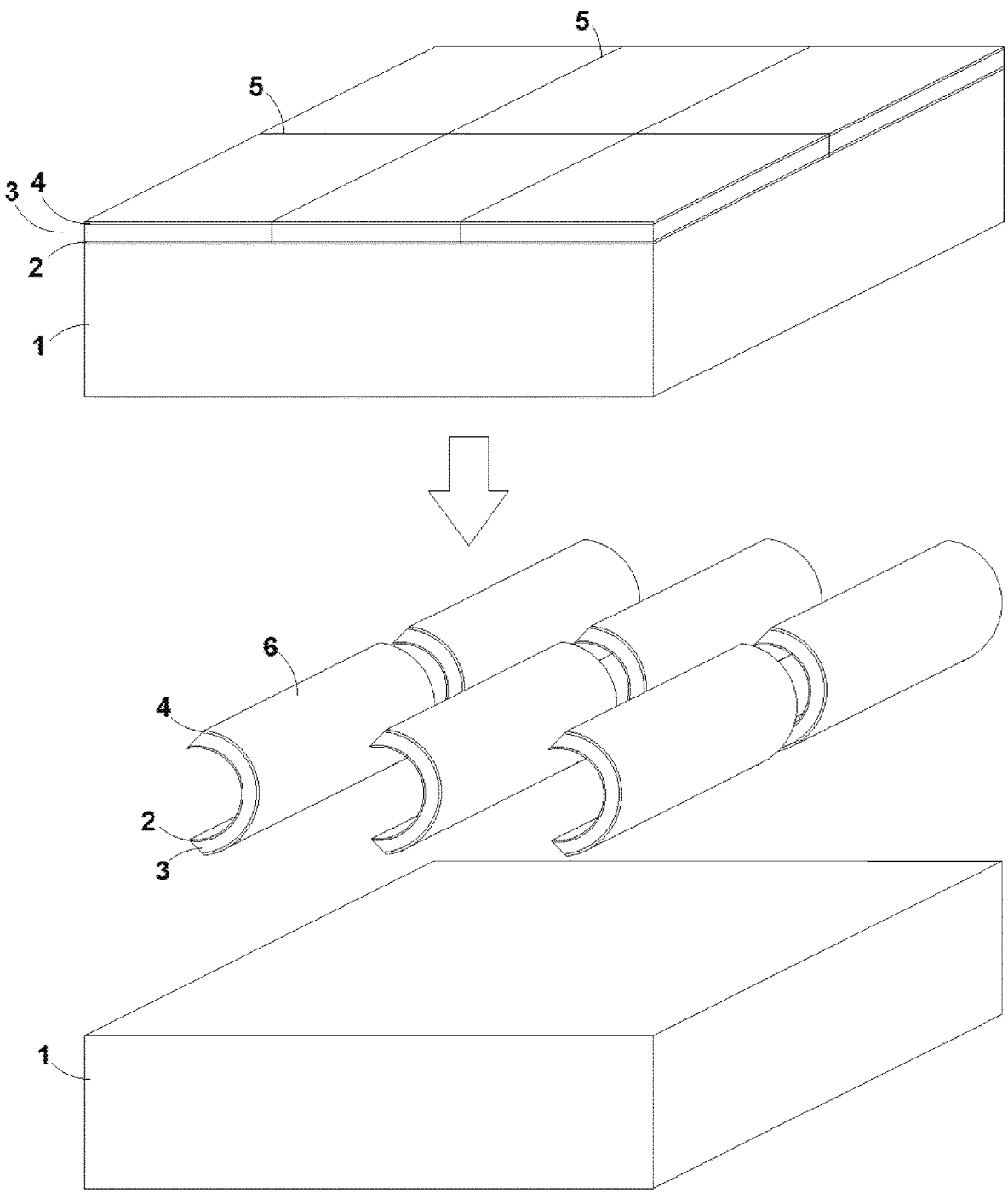

KIRIGAMI DERIVED METAL CATALYSTS

TECHNICAL FIELD

The present disclosure generally relates to providing catalyst particles having Kirigami derived shapes. More specifically, a combination of Kirigami derived shapes with thin film processing provides catalyst compositions with enhanced properties.

BACKGROUND

Catalysts are an important aspect of many industrial processes and products. For example, catalysts for oxygen reduction reactions or oxygen evolution reactions play key roles that enable a wide use of new technologies, such as fuel cells. Limiting factors in the commercialization of these catalysts include the efficiency and costs associated with the precious metals that are used to produce effective catalysts Of the several factors that influence catalytic activity, structural effects can be of crucial importance. Structural effects that can directly impact important catalyst properties include surface area to mass ratios, pore distributions, number of active catalytic sites, and the mechanical robustness of the catalyst. A major limitation to using metal catalysts, such as platinum catalysts, is that catalysis occurs at the surface of the active catalyst, thus metal disposed within the bulk of a catalyst particle is inactive. Hence there is a need for improved catalyst structures that are economical and scalable and provide optimized properties for enhanced catalytic activity.

SUMMARY

This section provides a general summary of the disclosure and is not a comprehensive disclosure of its full scope or all of its features.

In various aspects, the present technology is directed to processes that produce particle shapes for high surface area metal catalysts. The processes for producing a catalyst includes identifying a Kirigami pattern to be imposed on a flat deposition substrate. The process includes depositing thin films onto the flat substrate, mapping the Kirigami derived shape onto the films, and cutting at least the films to the mapped shape. Subsequent processing releases shaped Kirigami derived catalysts from the substrate, wherein the shaped catalyst as particles or a non-planar sheet upon release from the deposition substrate provide a three dimensional structure with high accessible surface area on and within the Kirigami derived catalysts.

In another aspect, a platinum or other metal catalyst has a Kirigami derived shape. The platinum catalyst contains thin films of platinum, a platinum containing alloy, or other catalytic metal or metal alloy, and a supporting metal film disposed between the catalytic metal films in the catalyst particles or sheets. The Kirigami derived catalyst, for example a Kirigami derived platinum catalyst, has a high surface area to mass ratio relative to a solid platinum particle or sheet of similar dimensions. The effectively high surface area and a high fluid accessibility to the catalytic film surface is generated by the folding of very thin films of the catalytic metal into the Kirigami shape that is retained upon release from the flat deposition substrate that supports the three metal film composite throughout the forming process. In this manner, the proportion of the mass of the catalytic metal at the surface and activity towards the desired reaction in a gaseous or condensed fluid is very high.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 shows a three metal laminar composite on a deposition substrate and patterned by a Kirigami map for the preparation Kirigami derived catalyst particles where, upon shaping and delaminating from the deposition substrate, half cylinder Kirigami derived catalyst particles are isolated.

It should be noted that the FIGURE set forth herein is intended to exemplify the general characteristics of the methods, algorithms, and devices among those of the present technology, for the purpose of the description of certain aspects. The FIGURE may not precisely reflect the characteristics of any given aspect and is not necessarily intended to define or limit specific embodiments within the scope of this technology.

DETAILED DESCRIPTION

Kirigami is the creative art of paper cutting and folding. As used herein, the term "mathematical framework of Kirigami" is intended to refer to shapes formed using Kirigami or a combination of Kirigami and Origami folding. Further, the term "Kirigami derived catalysts" refers to catalyst structures that have shapes created using Kirigami or Origami.

Particle shapes for an active catalyst are provided using Kirigami techniques that enhance the surface area to mass ratio. A mathematical framework to define a Kirigami pattern can be used to provide optimal particle shapes for optimization of the catalytic activity of a metal catalyst. An example of the mathematical framework of Kirigami to define a tessellation to be patterned for production of the Kirigami derived catalysts is described in Choi et al., Nature Materials, Vol. 18, September, 2019, pp. 999-1004, which is incorporated herein by reference in its entirety.

Common Kirigami tessellations are regular planar patterns formed by cutting flat, thin sheets that allow compact shapes to morph (self-assemble) into open structures with rich geometries. Examples of Kirigami derived catalysts are not limited to those with common tessellations for tiling, which are combinations of triangle, square, and hexagon shapes. The features can be those with open polyhedrons, cylinders, nested cylinders, honeycomb, and other structures with are complex combinations of any of flat or curved surfaces.

Optimal Kirigami shapes are effective for providing enhanced catalytic properties to the catalyst particle. Examples of enhanced catalytic properties are derived from the surface area to mass ratios in designed structures that behave in a manner that is achieved exclusively by having very small particle sizes or by having a large amount of pores in many state of the art catalysts, but where the packed catalyst mass may be limited in the effective surface and can inhibit fluid flow in a packed bed. The contrasting Kirigami derived catalyst, because the catalytic metal is presented as a very thin film on a surface and does not reside in the bulk of a particle or sheet, the surface area to mass is very high and the shape imposed by the Kirigami mapping and folding allows an improved accessibility to fluids containing at least one reagent. Additionally the Kirigami derived catalyst can display an improved mechanical robustness to accompany significantly reduced catalytic metal costs for a given volume activity. Some examples of catalysts which can be optimized include oxygen reduction catalysts, oxygen evolution catalysts, and hydrogen evolution catalysts.

Surface area to mass ratios of the catalytic metals are enhanced by the deposition of a series of three thin metal films on a substrate and the cutting of the three metal laminar composite, with or without the deposition substrate, to expose a greater proportion of the catalytic metal to reagents for a reaction catalyzed by that metal. The very thin films of the catalytic metal is less than or equal to 10 nm in thickness and are disposed on a non-catalytic supporting metal film, that provides the structural integrity to the shaped catalytic metal covered Kirigami derived catalyst's structure. The support metal film can be of the minimal thickness that retains the surface continuity and designed shape upon release of the Kirigami derived catalyst from the deposition substrate, and can be less than 1 micron in thickness, for example, 50 or 100 nm in thickness. Nanopores can be imposed in the thin catalytic metal sheets of the Kirigami derived structures by the mode of metal deposition or by post processing of the deposited catalytic metal to further enhance the surface area to mass ratio of the catalytic metal.

The Kirigami derived structures display mechanical robustness resulting from the continuous support metal film that is sandwiched by the very thin catalytic metal films. The Kirigami derived structures can be individual particles or can be a continuous non-smooth, non-planar, sheet where the particles or sheets can be combined in a catalyst bed with a hierarchal architecture that enhances density, strength, and flow of reagent bearing fluids through the catalyst bed. The Kirigami derived structures permit a reinforcement of the catalyst bed structure by the stabilization of the individual and combined features by a reinforcing geometry that is imposed by the folding pattern.

When the Kirigami derived structures are a plurality of particles, the particles can be of a single structure of a variety of structures that can be formed in the process of mapping and cutting the layered metal sheet. The dimension of the particles can be in sub-micron to multi micron in size, or greater, where the folding of the Kirigami derived structures allows a desired packing of the features. Simple methods of packing the particles can be carried out, such as methods where orientation is imposed by vibration or flow, where the complementary shapes of the particles or sheets promote a self-assembly of a catalyst bed. The relative orientation of the particles can be imposed by the Kirigami derived map where particle orientation is imparted upon release of the particles from the deposition substrate upon which the Kirigami derived structures are prepared.

The Kirigami derived catalysts can have catalytic films of platinum (Pt), palladium (Pd), rhodium (Rh), iridium (Ir), ruthenium (Ru), lead (Pb), gold (Au), silver (Ag), osmium (Os), or any alloy of these metals. Other metals that can be included in the alloys include iron (Fe), manganese (Mn), copper (Cu), cobalt (Co) and nickel (Ni). The metal substrate film between the catalytic films can be any metal or metal that provides the mechanical integrity of the final Kirigami derived structures. Metals that can be used include tungsten (W), tantalum (Ta), titanium (Ti), rhenium (Re) or alloys thereof. Depending upon the pressure, temperature, and other stresses to be imposed upon the Kirigami derived catalyst bed, various metals and metal thicknesses can be used for the metal support film. The support film does not catalyze a reaction, and is exposed to the reagent fluid only where the cuts are formed during Kirigami processing. Support metals can be any metal or metal alloy that is effectively inert towards the reagents and products of the catalyzed reaction yet provides stabilization of the structure imposed on the Kirigami derived catalyst.

An aspect of the invention is directed to the preparation of the Kirigami derived catalysts. A Kirigami pattern is determined for preparation of the shaped catalyst. The pattern is determined to achieve a desired density of catalytic sites for the volume in which a catalyst bed will be housed and to achieve a desired flow through the catalyst bed. A pattern is chosen that promote the formation of a desired Kirigami shape during delamination from a deposition substrate upon which the catalytic metal films and the metal support film are deposited. The thickness of the catalytic metal films, the supporting film, and the deposition substrate can vary, although minimal thicknesses to achieve a stable structure and a high catalyst activity are targeted. The temperature at which the deposition of the films are made can vary from low temperatures, for example that in contact with liquid nitrogen, up to temperatures as high as the maximum stable temperature of the deposition substrate.

The deposition substrate is selected for the deposition of three metal films or layers. The substrate can be a polymeric, carbon, or ceramic material that can be reused or sacrificed after release of the Kirigami derived catalysts from the deposition substrate. For example, the substrate can be a polyimide sheet. The substrate can be rough or smooth. When rough, the roughness can be a random or patterned series of peaks and valleys that can impose a higher surface are to the catalytic film deposited proximal to the deposition substrate. The pattern can be imposed by scribing, molding, ablation, or any other method.

All metal depositions to form the catalytic metal films or the supporting metal film can be carried out by any deposition technique, including any chemical, mechanical, thermal, or electrochemical method. The deposition can be carried out, for example, by physical vapor deposition (PVD) or chemical vapor deposition (CVD). The deposition can be a uniform deposition or non-uniform deposition, such that a smooth surface or a surface with a pattern of pores can be generated. The deposition of a first catalytic metal film is carried out directly upon the deposition substrate to a thickness of about 10 nm or less on average, for example, 2, 3, 4 or 5 nm. A metal support film of about 1 micron or less, for example, 10, 20, 30, 40, 50, or 100 nm or less is deposited upon the first catalytic metal film supported on the deposition substrate. Generally, the metal support film is thicker than the catalytic metal films. A second catalytic metal film of about 10 nm or less in thickness, for example, 2, 3, 4 or 5 nm, can be deposited on the metal support film such that the metal support film is sandwiched between two catalytic metal films. The first and second catalytic metal films can be of the same or different metals and their thickness can be equal or different and their smoothness can be different. The deposition substrate can be fixed within a chamber for metal deposition or the deposition substrate can be on a moving stage. The metal films deposition on a moving stage can be included, for example, in a roll to roll deposition process.

The conditions of the metal depositions can be established such that after the three metal depositions and laser cutting of the three metal composite films or a laser cutting of the three metal films and the deposition substrate in the shape of the Kirigami map. In one variation of the method, a physical stress can be imposed on the metal films by a change in the volume and/or shape of the deposition substrate. For example, the deposition can be carried out on a heated substrate such that upon cooling, a contraction of the deposition substrate promotes formation of the Kirigami structure and the delamination of the first catalytic film from the deposition substrate. Alternatively, the deposition can be on a cooled deposition substrate such that upon warming and expansion of the deposition substrate can occur to promote deformation and delamination of the composite metal film.

In another aspect of the invention, the deposition substrate can be a shape memory polymer that has a complementary shape to that of the Kirigami map that is imposed on the three metal laminar composite and the deposition substrate, where deposition is carried out on the shape memory polymer in a flattened mode. Flexing to a non-flat mode when warmed after cutting to the Kirigami map promotes the spontaneous shaping form the Kirigami derived catalyst. Shaping can be simultaneous with delamination of the deposition substrate or subsequent delamination can be carried out. The Kirigami pattern can be used in the formation of the shape memory polymer and an indexing feature can be incorporated to the deposition substrate such that the subsequent cutting from the Kirigami map align with the preformed structures of the shape memory polymer.

Alternatively, in another aspect, stress can be imposed by the swelling of the deposition substrate with a solvent where the increase in volume provides the stress and delamination of the three metal film composite or a solvent can extract mass from the deposition substrate in a manner that the lessening mass contracts the deposition substrate to impose deformation of the metal films and delamination of the degrading deposition substrate. Ultimately, the deposition substrate is removed from the Kirigami derived catalyst by physical or chemical effects on the deposition substrate. The deposition substrate can be dissolved, thermally decomposed, photochemically decomposed, or chemically degraded.

The stress can be impose mechanically by bending, for example around a dowel or roller, or by stamping with a stamp that has features that match or impose strategic points of stress on the cut Kirigami mapped sheet. The shaping can occur before or simultaneously with delamination of the deposition substrate.

The Kirigami map is projected onto the film and the film is cut such that the Kirigami shaped catalysts can be generate from the cut three metal film composite. The cutting can be by laser ablation as directed by the Kirigami map or by a photolithograph technique where a mask layer is applied to the top catalyst metal film and the layer photo-patterned and wet-etched to cut the metal layers.

As described above, the deposition substrate is removed from the three metal film composite after cutting of the Kirigami map with the release of the Kirigami derived catalyst. The released Kirigami derived catalyst shapes may be isolated by washing, filtration, flocculent, magnetic removal, or any other method.

Example

As shown in FIG. 1, production of half cylindrical Kirigami derived catalyst particles for a Pt catalyst is carried out where a polyimide sheet 1 is dispersed from a roll dispenser where the sheet is successively drawn through: a first platinum evaporator station, where a 3 to 5 nm film 2 is deposited; a tungsten evaporator station, where a 50 nm tungsten film 3 is deposited; a second platinum evaporator station, where a 3 to 5 nm film 4 is deposited; a laser scribe station, where the Kirigami map directs cuts 5 of the three metal composite sheet; a bending station, where the flat features of the Kirigami map flat structure are deformed out of plane in a cylindrical fashion; a liquid $CO_2$ washing station, where the half cylinder Kirigami derived catalyst 6 is delaminated from the polyimide sheet; and a take-up roll to collect the reusable polyimide sheet.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A Kirigami derived catalyst, comprising: a plurality of non-planar shaped particles, or at least one non-flat sheet comprising a three metal film composite having a shape derived from a Kirigami cutting and shaping of a flat sheet, wherein the three metal film composite comprises a first catalyst metal film and a second catalyst metal film on a respective proximal and distal surface of a supporting metal film.

2. The Kirigami derived catalyst according to claim 1, wherein the first catalyst metal film and the second catalyst metal film are independently selected the group consisting of from platinum (Pt), palladium (Pd), rhodium (Rh), iridium (Ir), ruthenium (Ru), lead (Pb), gold (Au), silver (Ag), osmium (Os), and alloys thereof.

3. The Kirigami derived catalyst according to claim 1, wherein the first catalyst metal film and the second catalyst metal film are platinum.

4. The Kirigami derived catalyst according to claim 1, wherein the supporting metal film is selected from the group consisting of tungsten (W), tantalum (Ta), titanium (Ti), rhenium (Re) and alloys thereof.

5. The Kirigami derived catalyst according to claim 1, wherein the first catalyst metal film and the second catalyst metal film are independently from 1 to 10 nm in thickness.

6. The Kirigami derived catalyst according to claim 1, wherein the first catalyst metal film and the second catalyst metal film are independently from 1 to 5 nm in thickness.

7. The Kirigami derived catalyst according to claim 1, wherein the supporting metal film is from 10 to 100 nm in thickness.

8. The Kirigami derived catalyst according to claim 1, wherein the three metal film composite is an oxygen reduction catalyst, an oxygen evolution catalyst, or a hydrogen evolution catalyst.

9. A method of forming a Kirigami derived catalyst comprising:
    selecting a Kirigami pattern for definition and scaling of a Kirigami map;
    providing a deposition substrate;
    depositing a first catalyst metal film on a surface of the deposition substrate;
    depositing a supporting metal film on a surface of the first catalyst metal film;
    depositing a second catalyst metal film on a surface of the supporting metal film such that a three metal film composite resides on the deposition substrate;
    cutting at least the three metal film composite according to the Kirigami map to form a cut three metal film composite;
    shaping the cut three metal film composite into at least one Kirigami derived shape;
    delaminating the deposition substrate from the Kirigami derived shape; and
    isolating the Kirigami derived catalyst from the deposition substrate.

10. The method of claim 9, wherein the deposition substrate is a polymer, ceramic, or carbon containing material.

11. The method of claim 9, wherein the deposition substrate comprises a polyimide sheet.

12. The method of claim 9, wherein the first catalyst metal film and the second catalyst metal film are independently selected from the group consisting of platinum (Pt), palladium (Pd), rhodium (Rh), iridium (Ir), ruthenium (Ru), lead (Pb), gold (Au), silver (Ag), osmium (Os), and alloys thereof.

13. The method of claim 9, wherein the first catalyst metal film and the second catalyst metal film comprise platinum.

14. The method of claim 9, wherein the supporting metal film is selected from the group consisting of tungsten (W), tantalum (Ta), titanium (Ti), rhenium (Re) and alloys thereof.

15. The method of claim 9, wherein depositing the first catalyst metal film, the second catalyst metal film, and the supporting metal film are physical vapor deposition or chemical vapor deposition.

16. The method of claim 9, wherein the cutting is laser ablation or photolithographic pattering and etching.

17. The method of claim 9, wherein shaping comprises bending or stamping.

18. The method of claim 9, wherein shaping is performed by dimensionally changing the deposition substrate.

19. The method of claim 18, wherein dimensionally changing the deposition substrate is by heating, cooling, solvent swelling, or extracting of the deposition substrate.

20. The method of claim 9, wherein the deposition substrate comprises a shape memory polymer.

* * * * *